W. T. LINGO.
LATHE CHUCK.
APPLICATION FILED DEC. 7, 1915.
1,192,437.  Patented July 25, 1916.
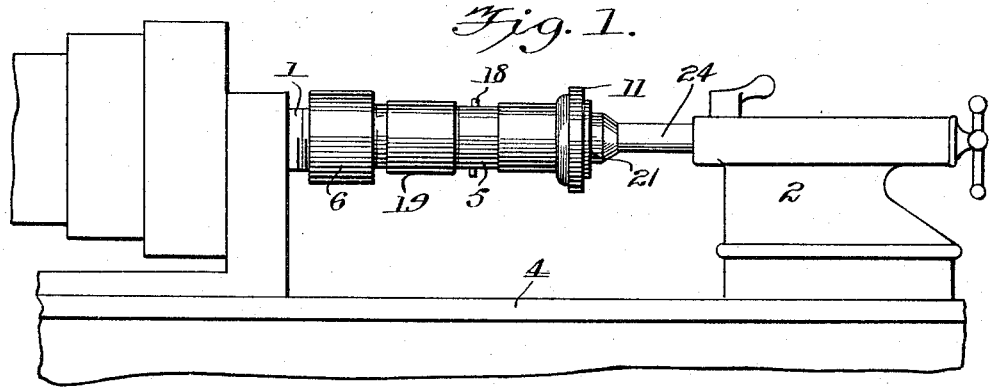
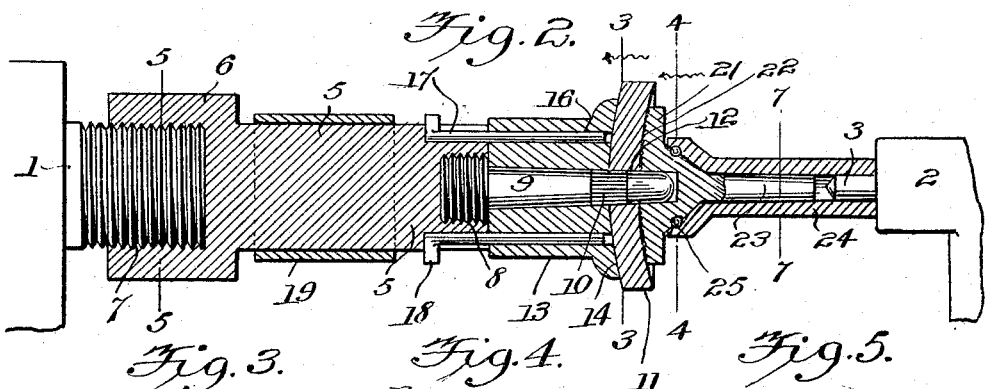
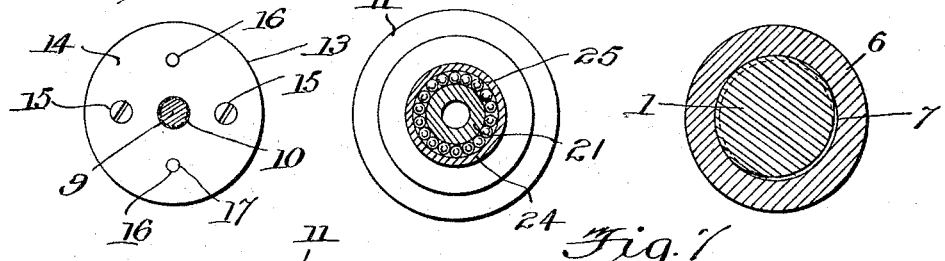
Witnesses
W. S. McDowell.
P. M. Smith.
Inventor
W. T. Lingo,
By Victor J. Evans
Attorney

UNITED STATES PATENT OFFICE.

WILLIAM T. LINGO, OF PHILADELPHIA, PENNSYLVANIA.

LATHE-CHUCK.

1,192,437. Specification of Letters Patent. Patented July 25, 1916.

Application filed December 7, 1915. Serial No. 65,597.

*To all whom it may concern:*

Be it known that I, WILLIAM T. LINGO, a citizen of the United States, residing at Philadelphia, in the county of Philadelphia and State of Pennsylvania, have invented new and useful Improvements in Lathe-Chucks, of which the following is a specification.

This invention relates to lathe chucks, the same being adapted to be attached to and operated by an ordinary lathe and being designed for the purpose of turning down washers so as to reduce the diameter thereof, the main object in view being to provide a device of the character referred to by means of which washers may be quickly centered and securely held in fixed relation to the rotary stock or body of the device which is constantly turning, the device embodying means whereby a washer may be clamped in position and detached after the work is finished, without stopping the lathe or the chuck of this invention.

With the above and other objects in view, the invention consists in the novel construction, combination and arrangement of parts, as herein described, illustrated and claimed.

In the accompanying drawings: Figure 1 is a side elevation of a lathe head, showing the chuck of this invention used in connection therewith. Fig. 2 is a central longitudinal section through the chuck on an enlarged scale, showing a washer held thereby. Fig. 3 is a section on the line 3—3 of Fig. 2. Fig. 4 is a section on the line 4—4 of Fig. 2. Fig. 5 is a section on the line 5—5 of Fig. 2. Fig. 6 is a face view of the washer. Fig. 7 is a section on the line 7—7 of Fig. 2.

Referring to the drawings 1 designates the live spindle of a lathe and 2 the tail stock, 3 designating the tail stock center which may be advanced and retracted by the usual means. The tail stock 2 is also adjustable longitudinally of the bed 4 of the lathe in the usual way, the parts just described being of the usual construction and arrangement.

In carrying out the present invention, I provide a chuck the body or stock of which is indicated at 5, one end thereof being enlarged as shown at 6 and internally threaded at 7 to enable the same to be screwed upon the threaded live spindle 1 as clearly illustrated in Fig. 2. The opposite end of the stock 5 is internally threaded at 8 to receive the threaded end of a tapered mandrel 9 a portion of which is preferably roughened or fluted as shown at 10 to enable a better hold to be taken upon a washer indicated at 11, the fluted portion of the spindle 9 extending through the central hole 12 of the washer 11.

13 represents a rotary washer driving head which is shown as having a concaved or dished abutment face 14 against which the washer 11 rests but it will, of course, be apparent that the face 14 may be perfectly flat without sacrificing any of the advantages of the invention as hereinafter claimed. The head 13 is secured to the stock or body 5 by means of screws 15 and is also formed with holes 16 extending therethrough to receive washer displacing pins 17 the inner ends of which are extended outwardly to form projections 18 against which a knocker sleeve 19 is adapted to strike for projecting said pins 17 against the washer 11 in order to forcibly displace said washer after the work thereon has been completed. The stock 5 is formed with slots 20 to admit of the necessary movement of the projections 18 at the inner ends of the pins 17.

A rotary pressure head 21 lies opposite the rotary driving head 13 and is shown as provided with a serrated convex face 22 to engage the washer 11. Where the face 14 of the head 13 is flat, however, the face 22 of the head 21 will also be flat but the serrations will preferably be retained. The head 21 embodies a shank 23 which is received in a tubular holder 24 the bore of which is of sufficient diameter to enable the holder 24 to fit over the tail stock center 3 as shown in Fig. 2. Ball bearings 25 support the head 21 in relation to the tubular holder 24 which is ordinarily non-rotatable.

From the foregoing description, taken in connection with the accompanying drawings, it will now be understood that washers may be engaged by and released from the chuck of this invention without stopping the lathe, the stock 5 rotating continuously. The tail stock 2 is backed off sufficiently to enable a washer to be placed in position and the tail stock is then advanced until the washer 11 is securely clamped between the heads 13 and 21 and advanced along the tapered portion of the mandrel 9. After the periphery of the washer 11 has been dressed down to the desired extent, the tail stock 2 is moved away from the head stock and if the washer does not fall from its position, it is forcibly ejected by means of the knocker sleeve 19 which is loose on the stock 5 and which may be grasped by the operator and thrust against the projections 18 of the washer displacing pins 17 causing the extremities of the latter to strike against the adjacent face of the washer and knock the same from its position.

Actual tests have shown that five hundred or more washers may be turned in the course of a single day as compared with considerably less than one hundred by the means now at hand.

In addition to the above features, the device can be readily utilized to turn bushings and like devices as will be obvious. Furthermore, by using pressure heads 21 of varying diameter the faces of the washer 11 may be conveniently dressed or finished while the invention, as an entirety, is in operation.

Having thus described my invention, I claim:—

1. A chuck for the purpose specified comprising a rotary stock adapted to be mounted upon the live spindle of a lathe, a head carried by said stock and rotating therewith, a work holding mandrel located centrally of said head, a rotatable work engaging pressure head working in opposition to the first named head, and holding means for said pressure head, one of said heads having a convex work engaging and distorting face and the other head having a concaved work engaging face which permits distortion of the work.

2. A chuck for the purpose specified comprising a rotary stock adapted to be mounted upon the live spindle of a lathe, a head carried by said stock and rotating therewith, work-displacing means carried by said head, a work holding mandrel located centrally of said head, a rotatable work engaging pressure head working in opposition to the first named head, and holding means for said pressure head.

3. A chuck for the purpose specified comprising a rotary stock adapted to be mounted upon the live spindle of a lathe, a head carried by said stock and rotating therewith, a work holding mandrel located centrally of said head, a rotatable work engaging pressure head working in opposition to the first named head and having a work distorting face, and holding means for said pressure head, said mandrel having a uniformly tapered and serrated face to engage in the bore of the washer.

4. A chuck for the purpose specified, comprising a rotary stock adapted to be mounted upon the live spindle of a lathe, a head carried by said stock and rotating therewith, a washer holding mandrel located centrally of said head, a rotatable washer engaging pressure head working in opposition to the first named head, holding means for said pressure head, a washer displacing pin carried by the first named head, and a knocker sleeve coöperating with said pin and loosely surrounding the stock.

5. A chuck for the purpose specified comprising a rotary stock adapted to be mounted upon the live spindle of a lathe, work displacing means carried by said stock, a rotatable work engaging pressure head working in opposition to the first named head, and holding means for said pressure head.

In testimony whereof I affix my signature in presence of two witnesses.

WILLIAM T. LINGO.

Witnesses:
HARRY P. BERNHARDT,
JACOB BATES.

Copies of this patent may be obtained for five cents each, by addressing the "Commissioner of Patents, Washington, D. C."